US008688078B2

(12) United States Patent
Cook et al.

(10) Patent No.: US 8,688,078 B2
(45) Date of Patent: Apr. 1, 2014

(54) SYSTEM AND METHOD FOR MOBILE SERVICE GEOCHRONOUS VALIDATION

(75) Inventors: Andrew Cook, Lenexa, KS (US); Jade Kerr, Kansas City, KS (US); Mohit Mathur, Olathe, KS (US); Michael Morrissey, Overland Park, KS (US); Clinton Smoyer, Raymore, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 642 days.

(21) Appl. No.: 12/398,772

(22) Filed: Mar. 5, 2009

(65) Prior Publication Data
US 2010/0227589 A1    Sep. 9, 2010

(51) Int. Cl.
*H04M 1/66*  (2006.01)
*G06F 17/30*  (2006.01)

(52) U.S. Cl.
USPC ................... 455/411; 455/456.1; 701/431

(58) Field of Classification Search
USPC ................ 455/411, 404.2, 414.1–414.4, 455/456.1–457
See application file for complete search history.

(56) References Cited

U.S. PATENT DOCUMENTS

| | | | | |
|---|---|---|---|---|
| 5,778,304 | A  * | 7/1998 | Grube et al. | 455/456.4 |
| 2002/0128774 | A1* | 9/2002 | Takezaki et al. | 701/211 |
| 2006/0046746 | A1* | 3/2006 | Ranford et al. | 455/456.5 |
| 2007/0286353 | A1* | 12/2007 | Itoh | 379/37 |
| 2010/0197324 | A1* | 8/2010 | Bolin et al. | 455/456.3 |
| 2010/0255858 | A1* | 10/2010 | Juhasz | 455/456.4 |

* cited by examiner

*Primary Examiner* — Kashif Siddiqui
(74) *Attorney, Agent, or Firm* — Patton Boggs LLP

(57) ABSTRACT

In one embodiment of the present invention, a system and method may be provided for validating communication for a wireless communications device. The system and method may include receiving a geographic location of a wireless communications device. A database comprising records correlating the geographic location with permissions may be accessed in order to determine, based upon the received geographic location information and the accessed database record, if there are restriction on communication associated with the wireless communications device. An indicator may be communicated in response to the determined restriction, effectively providing the information needed to inform the wireless communications device of any current restrictions.

20 Claims, 11 Drawing Sheets

```
                                              - □ X
FILE   EDIT   VIEW   TOOLS   HELP
← Back  → X  ↻
Address  http:\\restrictmyloc.com
```

☐ Business/Location Name  [_____]

☐ Insert Coordinates for Location to be  406   404
   Blocked  [_____]       408

☐ Radius Needed Around Coordinates    [_____]

402

Check Restriction Requested | Days
☐ No SMS       ☐ Vibrate Only     | Sun ☐   Wed ☐   Sun ☐
☐ No Voice     ☐ No Service       | Mon ☐   Thu ☐
☐ Hands-free only  (Ex. 911)      | Tue ☐   Fri ☐

410                                  412

[SUBMIT]       TIME RANGE  [_____]
               (ENTER 24 HOUR IF NO RANGE SPECIFIED)

416                                        414

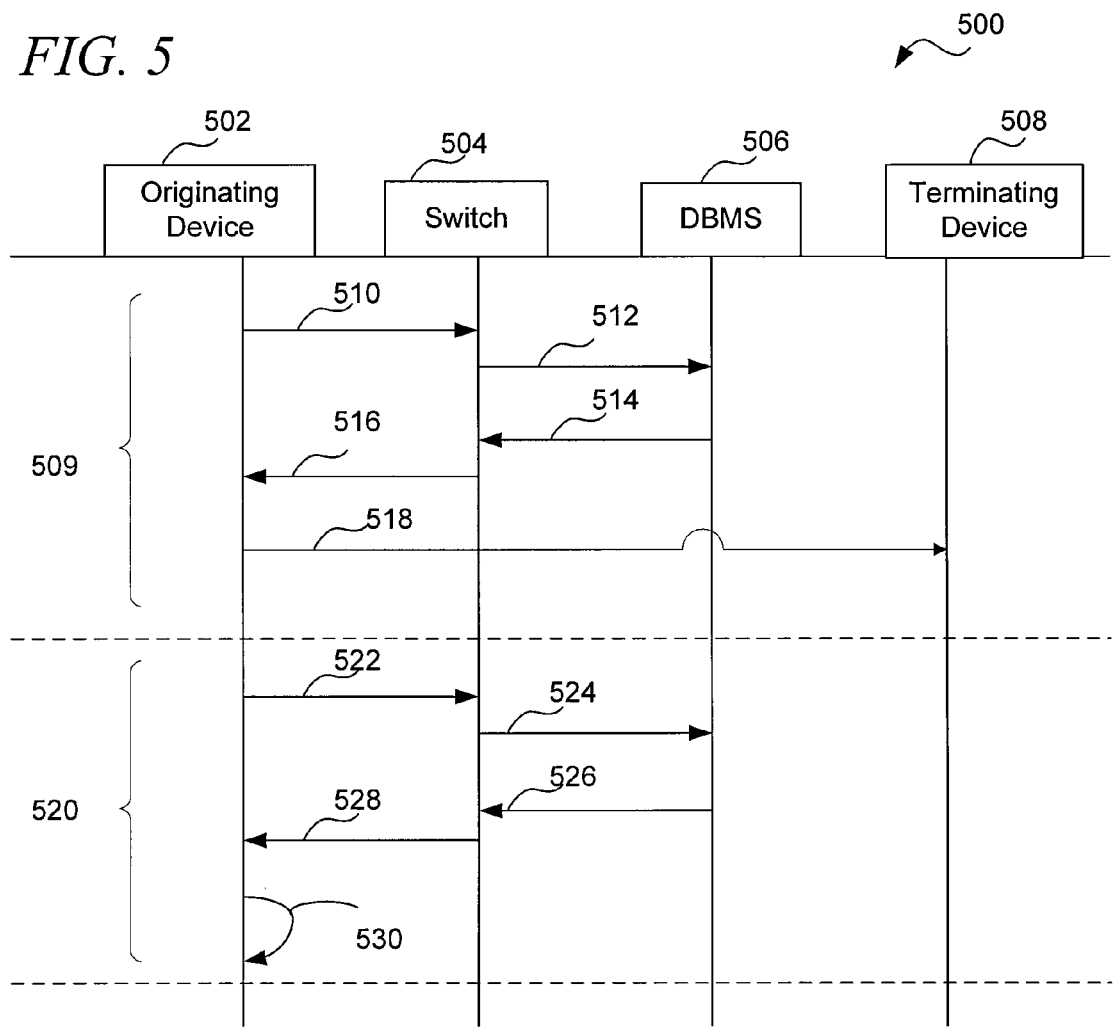
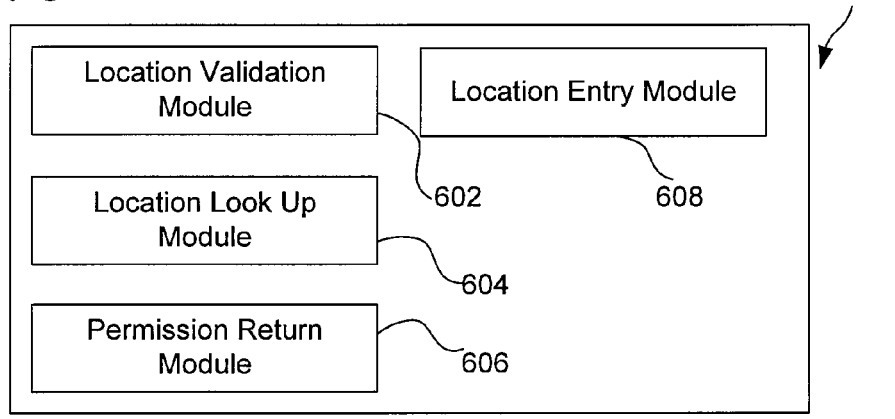

SYSTEM AND METHOD FOR MOBILE SERVICE GEOCHRONOUS VALIDATION

BACKGROUND OF THE INVENTION

Along with the rising use of wireless communications devices, such as cell phones and PDAs, have come laws and other restrictions regarding their usage. Driven largely by safety concerns, as well as a desire to reduce disruptions in classrooms, theaters, businesses, and the like, notices are being posted regarding restrictions, such as "no text messaging in school zones," "please turn off cell phones," "silence is golden," and many other variations depending upon what type of restriction is desired. Various methods have been attempted to force wireless communication restrictions on users, such as placing shielding on buildings and other signal blocking. However, current FCC regulations and practicality issues involving signal blocking have made previous attempts either illegal, overly intrusive, or at the very least, ineffective.

BRIEF SUMMARY OF THE INVENTION

In one embodiment of the present invention, by providing restriction on wireless communications devices at the network level, wireless communications may be effectively and centrally controlled by a service provider or a similar entity, without affecting network signals or involving physical modifications to structures. Along with legally imposed restrictions for certain locations, such as streets within a school zone, because restrictions are capable of being placed from a centralized location, a restriction database may be integrated within a communications network to allow database users, such as businesses or organizations, to "opt-in" and be included within the restriction database. Inclusion in the database may allow for communications restrictions to be placed at locations in which the database users have authorization to determine restrictions.

In one embodiment of the present invention, a system and method may be provided for validating communication for a wireless communications device. The system and method may include receiving a geographic location of a wireless communications device. A restriction database comprising records correlating the geographic location with permissions may be accessed in order to determine, based upon the received geographic location information and the accessed database record, if there are any restrictions on communication associated with the wireless communications device. An indicator may be communicated in response to the determined restriction, effectively providing the information needed to inform the wireless communications device of any current restrictions.

BRIEF DESCRIPTION OF THE DRAWINGS

Illustrative embodiments of the present invention are described in detail below with reference to the attached drawing figures, which are incorporated by reference herein and wherein:

FIG. 4A is an illustrative example of one embodiment of a screen shot for inserting data into a database, consistent with the present invention;

FIG. 5 is one embodiment of a timing diagram for validating communication permissions for a wireless communications device;

FIG. 6 is a block diagram of one embodiment of modules configured to validate communications over a communications network;

DETAILED DESCRIPTION OF THE INVENTION

Figure 1:
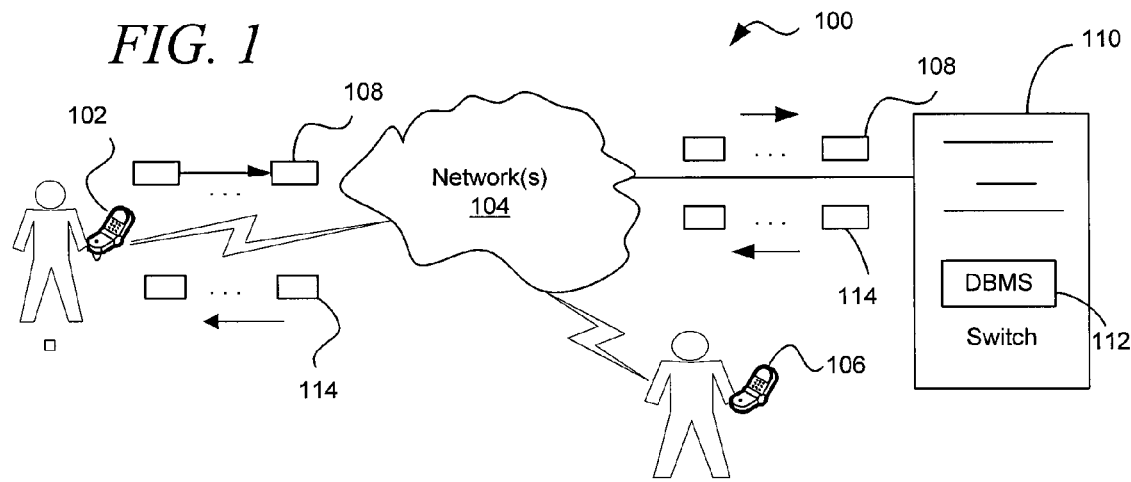
FIG. 1 depicts one embodiment of a communication validation system consistent with the present invention.

FIG. 1 depicts one embodiment of a communication validation system 100 consistent with the present invention. In one embodiment, a calling party 102 may communicate over a communications network 104 to a called party 106. Call data 108 may be communicated over the communications network 104 to the called party 106, with call data including not only voice data of the call, but additional information such as the calling party's 102 phone number and other signaling data and identification information available from the calling party 102. Alternatively, call data may include SMS messages, internet data, or any other communications capable of being communicated over the communications network 104. The call data 108, after being routed over the communications network 104, may be routed to a switch 110, which may include a database management system (DBMS) 112. The DBMS 112 may determine permissions data 114, which may be communicated over the communications network 104.

The DBMS 112 may be located within the switch 110, or the DBMS 112 may be located in one or more separate devices in communication with the switch 110. Functionality of the DBMS 112 may be centralized, distributed, or partially distributed. A centralized DBMS 112 may include database information for an entire region, state, or other division all in one location. For a distributed or partially distributed DBMS 112, multiple copies of all or portions of the DBMS 112 may exist, and may be updated separately as data changes. In one embodiment, each cell tower may include a DBMS 112. In this case, only database information that relates to locations serviced by the particular cell tower may be necessary to be replicated to each DBMS 112.

The DBMS 112 may include one or more databases containing information that may include Global Positioning System (GPS) coordinates, mobile services that are available, time stamps, and permissions. The GPS coordinates may be included in database records associated with mobile services that are available for the particular GPS coordinates. The time stamps, or other indications of time restrictions, may also be included within a database record in order to determine what day and time various mobile services are restricted at the particular GPS coordinate location.

Entries into the DBMS 112 may include locations, such as streets, school zones, stores, offices, courtrooms, prisons, government offices, theatres, businesses, facilities, churches, performance halls, or any other location or building where a person having the authority to enter the location within the DBMS 112 chooses to restrict wireless communications (hereafter "restricted locations"). Opting-in to the DBMS 112 is described in greater detail below.

In one embodiment, the permissions data 114 may be communicated over the communications network 104 to both the calling party 102 and the called party 106. The permissions data 114 may include a code or indicator that a wireless communications device is configured to interpret to inform the wireless communications device of any restrictions in the present location. Example permissions may include no wireless service, no voice calls, no text calls, silent mode only, hands-free functionality only, etc. When receiving the permissions data 114, the calling party 102 is informed as to whether or not communication is restricted at the location where they are presently located. For example, if the permissions data 114 indicates that there are no restrictions, the call data 108 may be communicated over the communications network 104 to the called party 106 without any restrictions. However, if the permission data 114 indicates a restriction on the type of wireless service available, the calling party 102 will be notified, and based on the permissions data 114, may be instructed to alter the type of communication that will be sent, such as text only or voice only, or may be inhibited from making the communication at all.

The permissions data 114 may be communicated to the called party 106 and to notify the called party 106 that restrictions are currently being placed on the calling party 102, and explain a lack of communication from them or a dropped call that had occurred. Notifying the called party 106 may be useful in an emergency situation when a calling party 102 is restricted from a certain type of communication, but would like to let a third party know that an attempt was made.

In one embodiment, a DBMS 112 may be in communication with the communications network 104 rather than located within a switch of such communications network 104. Such an embodiment may allow DBMS 112 to service service providers, providing for an ubiquitous repository. Such an embodiment may also allow users to opt-in to a database. Such an embodiment may be accessed by service providers without requiring them to refer to multiple data sources in order to determine network restrictions based on location and time. In one embodiment, additional data sources may also be used in conjunction with the centralized DBMS 112 for providing service provider specific restrictions or for other service provider specific purposes.

The use of a network resource to control wireless communications from a particular location, rather than local means such as active or passive wireless interference, has many advantages. For example, in one or more embodiments of the present invention, attempting to block certain wireless signals through local means may inadvertently block allowable wireless signals. Another advantage is that no local equipment may be necessary for controlling wireless service availability though use of a network resource. Additionally, in one embodiment, controlling wireless availability from the network side may allow for the ability to ensure compliance with various laws and regulations, and to be able to perform advanced availability regulation beyond a strict "on" or "off" availability, such as modifying a ringer setting to vibrate or ensure hands-free functionality is being used. Also, other methods to block signals may be more expensive to implement, notwithstanding regulations and laws, currently in existence that indicate wireless signal blocking may not be authorized in certain circumstances.

Figure 2:
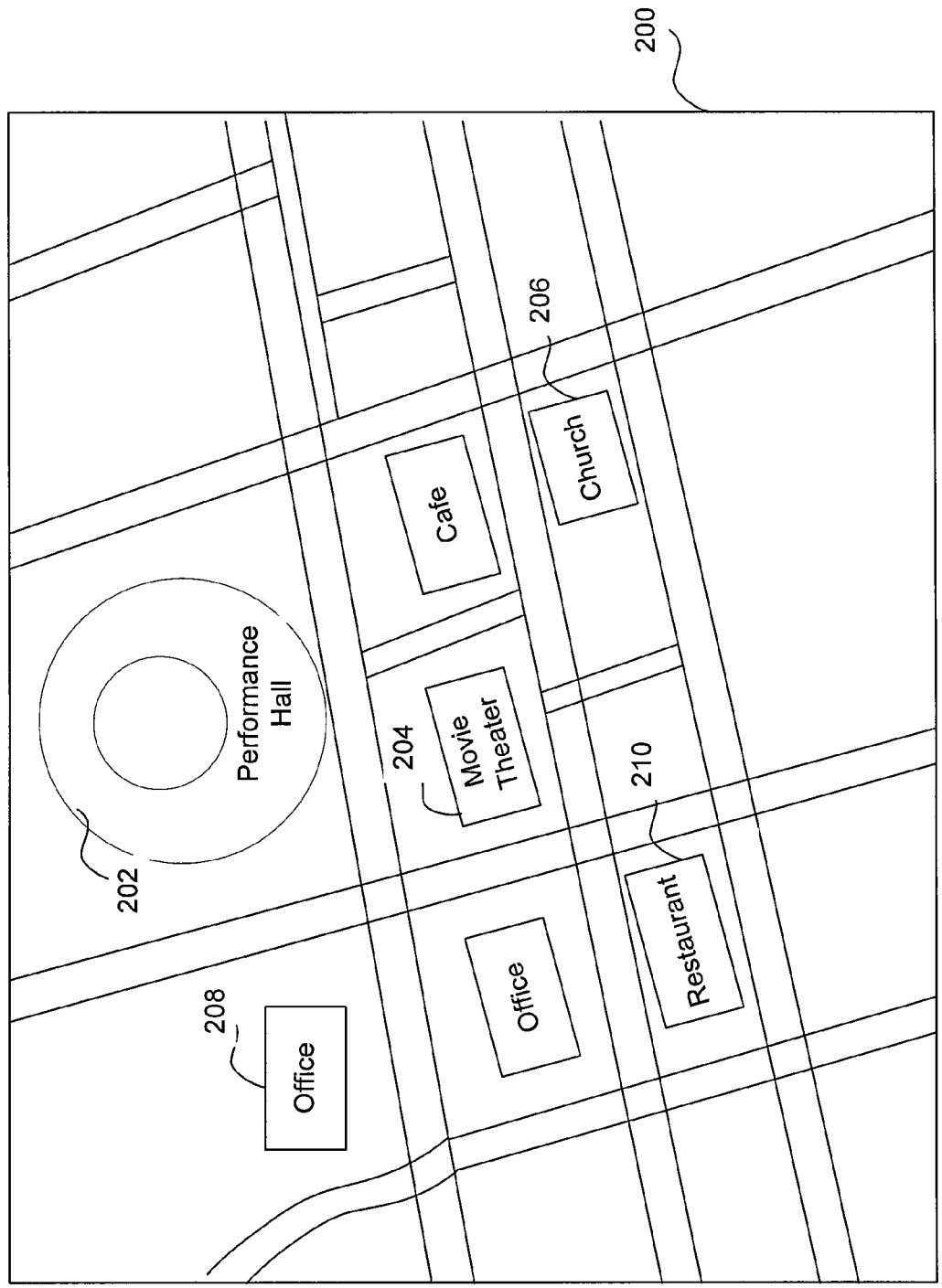
FIG. 2 is an illustration of a map of one embodiment of communication restriction locations consistent with the present invention.

FIG. 2 is an illustration of a map 200 of one embodiment of restricted locations consistent with the present invention. The map 200 includes various buildings, some of which may opt-in to a database such as the DBMS 112 described in FIG. 1. Certain restricted locations may want to attempt to control not only whether people at said location can place calls, but also control whether text messaging is allowable or if a ringer setting should be modified. For example, a performance hall 202 may not want to allow audible rings to occur, but may not wish to restrict vibrating alerts or text messaging. A person having the authority to enter location and restriction information into the DBMS 112 may set the permissions to indicate what communications are allowable within the boundaries of the building. More detailed information on inputting the coordinates and other location identification information associated with restricted locations is provided below in greater detail.

Each restricted location may have various requirements or different thresholds for what is allowable at such location. Alternatively, a location may not want any restrictions within their location. In this case, the person responsible for such location may choose not to opt-in to the centralized database or DBMS 112 and will not be included as a restricted location.

The map 200 also depicts streets that may additionally include various restrictions for drivers on the street, such as no cell phone operability in school zones, no texting in school zones, or any other number of restrictions applying only to streets, rather than buildings along the street. Municipal (e.g., city, state or federal) regulations may additionally be included within the DBMS 112, or may be included in a separate data storage location depending on the particular configuration chosen. For example, entire cities, such as Washington, D.C., only allow audio communications by drives if the wireless communications device is being used with a hands free device. One advantage to blocking or providing other restrictions on wireless communications by using GPS coordinates is the ability to narrowly limit where communication is restricted. For example, GPS using DGPS/WAAS has an accuracy to within 1-3 meters. Therefore, buildings and other areas outside of the street are not affected by the restrictions intended just for the street. For example, a device that provides signal interference may not be able to narrowly tailor the signal interference just to the street, and therefore, surrounding areas would also be affected by the signal interference. Various ways to use GPS coordinates to restrict wireless communications are described below in greater detail in regard with FIG. 4.

Figure 3:
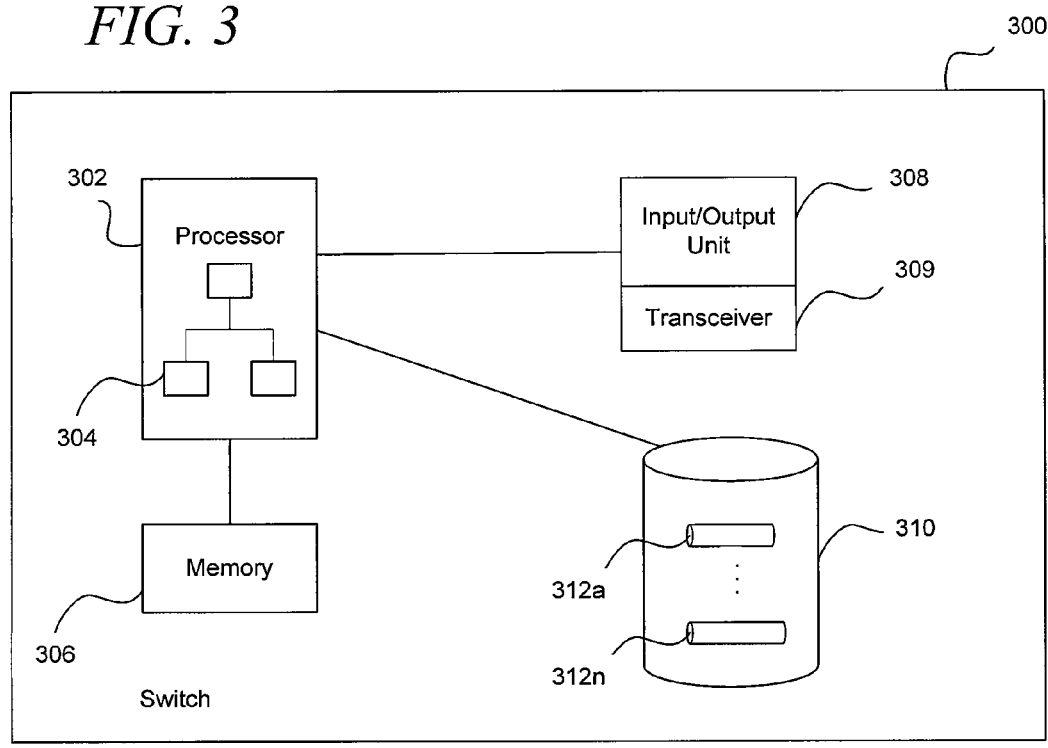
FIG. 3 depicts components of one embodiment of a switch consistent with the present invention.

FIG. 3 is a block diagram depicting components of one embodiment of a switch 300 operable to provide communication validation consistent with the present invention. The switch 300 may include a processor 302 for processing calls and data and accessing to database tables containing information regarding communications restrictions. The processor 302 may execute software 304 operable to perform functionality of the switch 300, including communications validation. Software modules that operate in the software 304 are described below in more detail in reference to FIG. 6. Memory 306 may also be located within the switch 300 for storing data being processed by the processor 302. The switch 300 may include an input/output (I/O) unit 308 for receiving and communicating voice and other data between wireless communications devices and the switch 300 over a communications network. The I/O unit 308 may additionally include a transceiver 309 for transmitting voice and data to the communications network. A data storage unit 310 may be included in, or be in communication with, the switch 300. The data storage unit 310 may be a hard drive or any other type of volatile or non-volatile memory capable of storing data. Within the data storage unit 310 may be one or more data repositories 312a-312n (312), such as a database or multiple databases, capable of storing and organizing data. Some example data may include subscriber information, location information, and restriction information, but any information may be stored within the data repositories 312. In one embodiment, rather than including the data storage unit 310, the switch 300 may use a memory 306 that is large enough to store any necessary data.

Figure 4B:
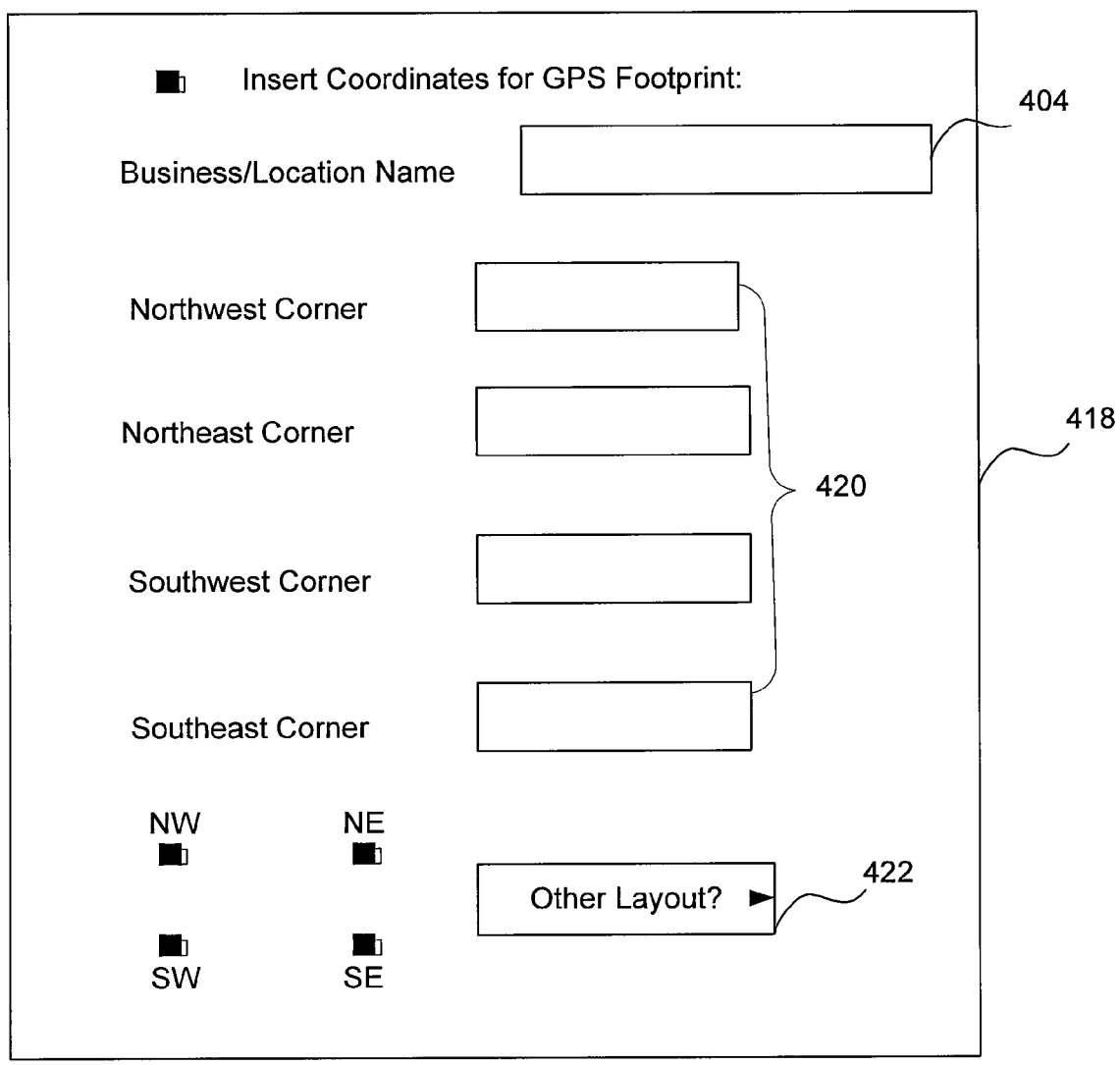
FIG. 4B is an illustrative example of one embodiment of a screen shot for inserting data into a database, consistent with the present invention.

FIG. 4A is an illustrative example of one embodiment of a screen shot 400 for inserting data into a database consistent with the present invention. In this embodiment, the screen shot 400 includes a location information entry section 402 which may include a name entry field 404, a coordinates entry field 406 and a radius information field 408. The location information entry section 402 may have any combination of fields, however, a basic need for being able to associate specific coordinate location information with a location name will generally need to be met. In one embodiment, a single coordinate represented by the coordinates entry field 406 is combined with a radius around the coordinates, which would be entered in the radius information field 408 to determine how far the restriction area should reach. Using a radius around a coordinate location is one of the more simple examples. However for a building such as a round stadium or a performance hall, coordinates located within a radius around a single point may be determined most effectively in this manner. A more elaborate way to determine a zone of restriction is described below in FIG. 4B.

As mentioned previously, businesses or other locations may choose to opt-in to a database and may be presented with a screen similar to screen shot 400. After entering a name within the named entry field 404, as well as the coordinates and radius around the coordinates, restrictions for the particular area may be entered by use of a restriction entry field 410. In this embodiment, some examples of restrictions include no Short Message Service (SMS), no voice calls, vibrate only, hands-free only, or no service with the exception of 911 or another emergency type of call. In one embodiment, "No SMS" may mean that text messages are not allowed to be sent or received. "No voice" may mean only text messages or other silent communications may be allowed to be sent. "Vibrate only" may require ringers to be in the off setting, "hands-free" may require the use of a hands-free device. "No service" may block any communication other than emergency services.

In addition to the restriction entry field 410, a user entering permissions information may also enter data into the day entry field 412. The day entry field 412 may allow the user to chose certain days in which restrictions are to be applied to communications at a location. A check or some other indication may be used to select the days of the week in which the restriction is desired. Time entry field 414 allows a particular time to be entered by the user, if a particular time would be beneficial information. For example, if a restriction is provided only during school zone hours near a school, the time range may be entered as "7:00 a.m.-3:00 p.m.", if that is the school's normal school zone times. The days in the day entry field 412 may be selected Monday through Friday, leaving Saturday and Sunday without restrictions. A submit button 416 may be provided to allow a person entering the data to upload options selected and data entered to the centralized database, such as the DBMS 112 described in FIG. 1. It is to be understood that this is simply one embodiment of entry fields provided for user input and many variations may also be used.

FIG. 4B is an illustrative example of one embodiment of a screen shot 418 for inserting data into a database consistent with the present invention. Similar to the name entry field 404 described for FIG. 4A, a business or other location name may be provided within the name entry field 404. Rather than a single set of coordinates, a group of coordinates may be used in this embodiment, and entered into a detailed coordinates entry field 420. Particularly useful for a square or rectangular location to be identified, coordinates for each corner may be entered within separate fields with the location being defined within the boundaries of the coordinates.

With the realization that not all locations are rectangular in shape, or with just four corners, in one embodiment an application is provided to allow a user to select a layout wizard for a building or other location is provided via a layout wizard initiator button 422. By having a layout wizard, a separate screen or application (not shown) may be viewed or accessed, providing a multitude of ways for distinctly entering a selected location's coordinate information. For example, in one embodiment, the layout wizard may be a graphical tool that allows a user to select one of numerous preformatted shapes that represent common structures. Alternatively, if the location is not one of the preformatted shapes, a user may create a shape matching the location to be entered using a mouse, touch screen, or any other known input devices. Each corner or vertex of the preformatted or created shape may be assigned geographical coordinates in order to delineate boundaries of the location. Using information provided, interior coordinates for a location may be extrapolated based upon the coordinates of the corners of a location. Any such interior coordinates within the bound area will inherently be included in the stored location of a restricted location, and also considered to be restricted. An advantage of not including every single coordinate, or at least only including bounded edges of a restricted location, allows a database containing permissions based on location to remain a manageable size.

FIG. 5 is one embodiment of a timing diagram 500 for validating communication permissions for a wireless communications device. The timing diagram 500 includes communications among an originating device 502, a switch 504, a DBMS 506, and a terminating device 508. A no-call-restriction sequence 509 may include a series of communications for indicating to a calling party that no call restrictions are in place in their present location. Additionally, a call restriction sequence 520 may be included when there are restrictions in place.

In step 510, a signal may be sent from an originating device, such as a cellular phone or PDA, to a switch 504. The switch 504 may be a Voice over Internet Protocol (VoIP) soft switch, a mobile switching center, a telephone exchange, or any other central office where calls may be routed. From the switch 504, a signal may be sent to a DBMS 506 in step 512. The DBMS 506 may include one or more databases which contain information regarding location coordinates and various restrictions and/or permissions that are in effect for a particular location. The DBMS 506 may respond to the switch 504 in step 514, with location permission information. The switch in step 516, may route the location permission information received from the DBMS 506 to the originating device 502 in step 516. The originating device 502 may interpret the received signal from step 516 to indicate that no restrictions are in place for the present location. In step 518, a call may be placed from the originating device 502 through the switch 504 to the terminating device 508 over a network. The network may be a public switch telephone network (PSTN), the Internet, satellite network, or any other type of network operable to communicate the communications data.

A second sequence, the call restriction sequence 520, may occur to indicate that calls or other services are restricted in the current location. In step 522, a signal, including call data and location information, may be sent from the originating device 502 to a switch 504. In step 524, the switch 504 may route calling information to the DBMS 506, which includes the coordinates of the originating device 502. The DBMS 506 uses the received information and returns to the switch 504 permissions regarding what is permissible in a particular location to the switch 504, in step 526. The permissions sent to the switch 504 may then be sent to the originating device 502 in step 528. The originating device 502 interprets the received permissions, and in step 530, may send a notification to a user of the originating device that there is a restriction on the communication based upon the location at the present time. Some examples of a notification may include a written message displayed on a display screen of the originating device 502, an audible message, tone, or other audible indication, or if the permission indicates the phone may only be used in silent mode, the ringer may be automatically disabled on the phone. Another example of a permission that may be provided from the DBMS 506 may include "no text messaging" capability. In this case, the ability to send a text message may be disabled at the originating device, however audio calls and other features may still be allowed.

One situation not depicted within the timing diagram 500 is when a terminating device is located within an area having particular restrictions, but an originating device has no location based restrictions. For example, if a particular terminating device 508 is located within a movie theatre where only silent calls (or text messaging) are allowed, and a call came from an originating device 502 without any restrictions, the embodiment is also operable to determine that the terminating device 508 is within a restricted location, and alter settings such as placing the terminating device into silent mode, as well. Continuing along with the no-call-restriction sequence 509, after step 518 where call data has been sent to the terminating device 508, a request may be sent from the switch 504 to the DBMS 506 that includes GPS information received from the terminating device 508 to determine if the terminating device is within a restricted location. There are several scenarios that may additionally benefit from the present invention, however, it is important to recognize that both originating and terminating devices may be affected.

Although not illustrated herein, in one embodiment associated with a specific implementation of a cellular communications network, a mobile switching center may receive a request for communications from an originating device such as origination device 502. Such request may include information regarding the location of the originating device. The mobile switching center may query a service control point or other remote device or database to determine if the location is associated with an identification of a restricted location. The service control point may further communicate with a service data point. Either the service control point or the service data point may include the components and functionality of DBMS 506. The service control point may determine restrictions associated with the location if it corresponds to any restricted location and communicate such restrictions to the mobile switching center. The mobile switching center may then permit or restrict communications by the originating device 502 by, for example, terminating a call, not connecting a call, not delivering a message, send a notification to the originating device, or via any other suitable response.

FIG. 6 is a block diagram of software modules 600 configured to validate communications over a communication network. The software modules 600 are software modules provided in one embodiment of the present invention. Other embodiments may include additional modules not described, as well as some modules described herein being consolidated together, depending upon the particular embodiment. A location validation module 602 may receive coordinates from a calling party and then proceed to call a location look up module 604, described below. In addition to receiving coordinates for a calling party, the location validation module 602 may also receive coordinates belonging to the called party for determining whether there are any location restrictions on the called party. In one embodiment, the location validation module 602 may also perform a check on the coordinates to determine the feasibility of the coordinates based upon available cell tower information. In order to prevent hacking, having a feasibility check on the coordinates may be useful. For example, if received cell tower information indicates the cell tower information is from a location that is not near the coordinates, an attempt to hack the coordinate information to bypass restrictions may be occurring.

The location look up module 604 may be incorporated within the location validation module 602, or may be located within its own module. The location look up module 604 may determine, based upon received coordinates and the time and date in which the coordinates are received, whether there are any restrictions that should apply to wireless communications devices at the particular location. The location look up module 604 may communicate permissions information over the communications network back to the requesting device. In one embodiment, a permission return module 606 returns the determined permission rather than a location look up module 604. Providing a separate permission return module 606 may allow for the processing of data to be divided between modules allowing for faster communications and more permissions to be processed simultaneously. Within the receiving device, such as a cellular telephone, software may be operable to interpret the permissions returned by the permissions return module 606. In an alternative embodiment using standard commands, the receiving device may not have to be modified.

A location entry module 608 may additionally be provided for allowing entry of locations, coordinates, days of the week or other time and restriction/permission information within a DBMS. Screen shots as described above in FIG. 4 may be generated by the location entry module 608 or by a similar module working in communication with the location entry module 608. The location entry module 608 may be accessible via the communications network, the Internet, or any number of other resources operable to communicate needed data to the location entry module 608.

Figure 7:
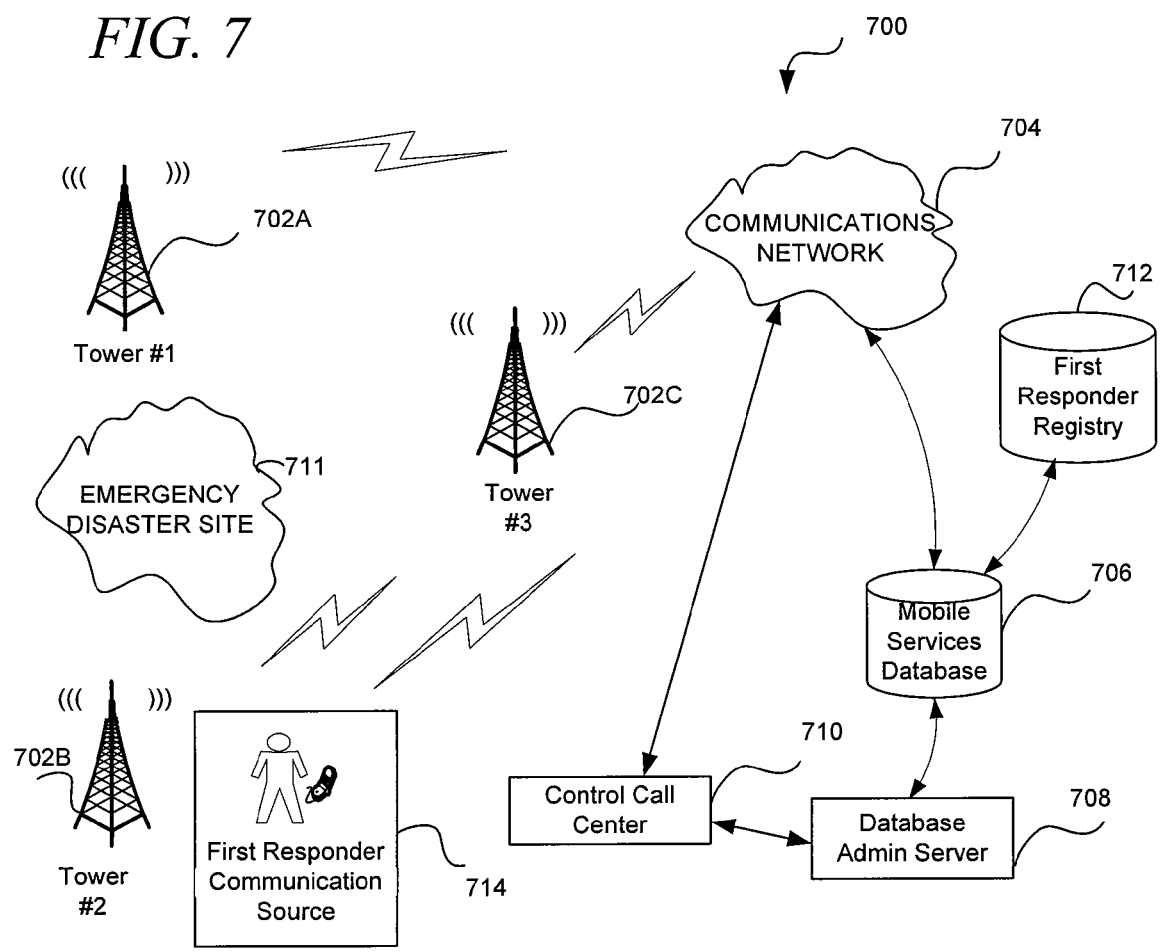
FIG. 7 depicts one embodiment of a communication validation system including emergency responder preemption, consistent with the present invention.

FIG. 7 depicts one embodiment of a communication validation system 700 including emergency responder preemption, consistent with one embodiment of the present invention. As used herein, preemption may refer to a complete denial of communications over a communications network or may refer to a prioritization of the communications, wherein emergency communications are prioritized over non-emergency communication over the communications network. Additionally, as used herein, prioritization may refer to placing a higher priority on emergency communications, as well as allowing emergency communications to occur where they would have otherwise been disabled, based on being in restricted locations. Thus, in one embodiment, emergency responder preemption allows a communications network to preempt all or part of the traffic from a network, with the exception of emergency communications. Alternatively, emergency responder preemption may prioritize communications to allow for emergency communications to receive a higher priority. In one embodiment, Tower 1 (702A), Tower 2 (702B), and Tower 3 (702C) may be in communication with a communications network 704. The communications network 704 may further be in communication with a mobile services database 706, as well as a database administration server 708. The database administration server 708 may additionally be in communication with a control call center 710, which may be configured to triangulate an emergency disaster site 711 in order to obtain GPS coordinates during an emergency. The call control center 710 which may additionally be operable to identify towers servicing the emergency disaster site 711, issue a preemption command to the towers, as well as to issue an all-clear instruction to resume normal operations, upon the determination that an emergency has subsided.

In the event of an emergency, a first responder registry 712 may be queried by the mobile services database 706, the database administration server 708, or the control call center 710, depending on the particular configuration of the network. The first responder registry 712 may include a list of first and second responders, support personnel, law enforcement, skilled support personnel, and other necessary personnel, which in the event of an emergency, may have exclusive or prioritized use and operation of mobile services within the network for a particular emergency disaster site 711.

In one embodiment, in the event of an emergency, a first responder communications source 714, such as law enforcement personnel, may request for mobile services preemption at an emergency disaster site 711. The request may be communicated over Tower 702 via the communications network 704 eventually being handled by the control call center 710. The control call center 710 may be operable to triangulate an emergency disaster site 711 based on a location of the first responder communication source 714 in order to limit which towers are affected by the preemption. The control call center 710 may issue the preemption command via the database administration server 708, which in one embodiment, may inform the mobile services database 706 of the affected towers, and what type of preemption is necessary. The database administration server 708 may function as a coordinator between various components of the network, facilitating communications between the control call center 710 and the mobile services database 706. In an alternative embodiment, the database administration server 708 may be combined with the mobile services database 706 or the control call center 710.

Within the mobile services database 706 may be GPS coordinates, mobile services available, time stamps, and permissions, such as those in the DBMS described for FIG. 1. During normal operations, mobile services database 706 may not query the first responder registry 712 and the mobile services will be determined based upon the information included within the mobile services database 706 similar to the DBMS 112 in FIG. 1. Other embodiments may not include a mobile services database at all, and preemption may be based purely upon the first responder registry. In this embodiment, the mobile services database 706 will now operate to handle calls by querying the first responder registry 712 each time a request for communications comes from the preempted towers which have been communicated from the control call center 710. In alternative embodiments, the first responder registry may be located in a single location, distributed across the network, or partially distributed.

In one embodiment, communications from emergency responders may always be prioritized over other communications, regardless of any preemption or emergency condition. For this embodiment, a check of the first responder registry 712 may occur for each communication request received, rather than checking the first responder registry only when preemption or an emergency has occurred. When communication is determined to be from an emergency responder, automatic prioritization may help to ensure communication is completed regardless of network congestion or other factors. One advantage of this embodiment is where no preemption has been requested, but peak call time is occurring and an emergency worker would have previously been unable to complete a call or other communication, the emergency worker now has priority, and the communication chances are improved.

In one embodiment, during an emergency where preemption has been activated, if a user attempts mobile communication and is not registered in the first responder registry 712, the message may be returned via the mobile services database 706 through the communications network 704 to the user (not shown) informing the user that there is an emergency and their communication has been preempted. By placing limits on who can use mobile services, either voice or data, during an emergency or disaster, overloaded communication networks and subsequent delays and response of the communications network will be drastically reduced. When an emergency is determined to be over or subsiding, the first responder communication source 714 or a similar source with equal authority, may issue an "all clear" instruction that would cause the preemptive command to be removed. All mobile service communications within the affected area would be returned to default behavior using the mobile services database 706 without the use of a first responder registry 712.

Similar to the previously described DBMS, the mobile services database 706 may be ubiquitous and allow access and use by any and all mobile services providers, and would be preferably maintained by the government or an industry standard group. In another embodiment, users may additionally opt-in to the mobile services database 706, in order to restrict communications at their location, similar to an earlier described embodiment. The first responder registry 712, which lists mobile devices for the first and second level responders, skilled support, law enforcement, and any other necessary personnel in the event of an emergency, may similarly be maintained by the government or an industry standards body in order for the database to serve a useful purpose by only allowing those necessary, in the event of an emergency, to have access to the communications network.

In one embodiment, communications determined to be from emergency responders may ignore or otherwise override any limitations of restricted locations, which are contained in the mobile services database 706. An additional check of the first responder registry 712 may be necessary to determine that communications are from an emergency responder, which may automatically override restrictions placed by the mobile services database 706. Whether or not a preemption command has been issued or an emergency occurred, in this embodiment, location restrictions will not apply to any device determined to belong to an emergency responder.

Figure 8:
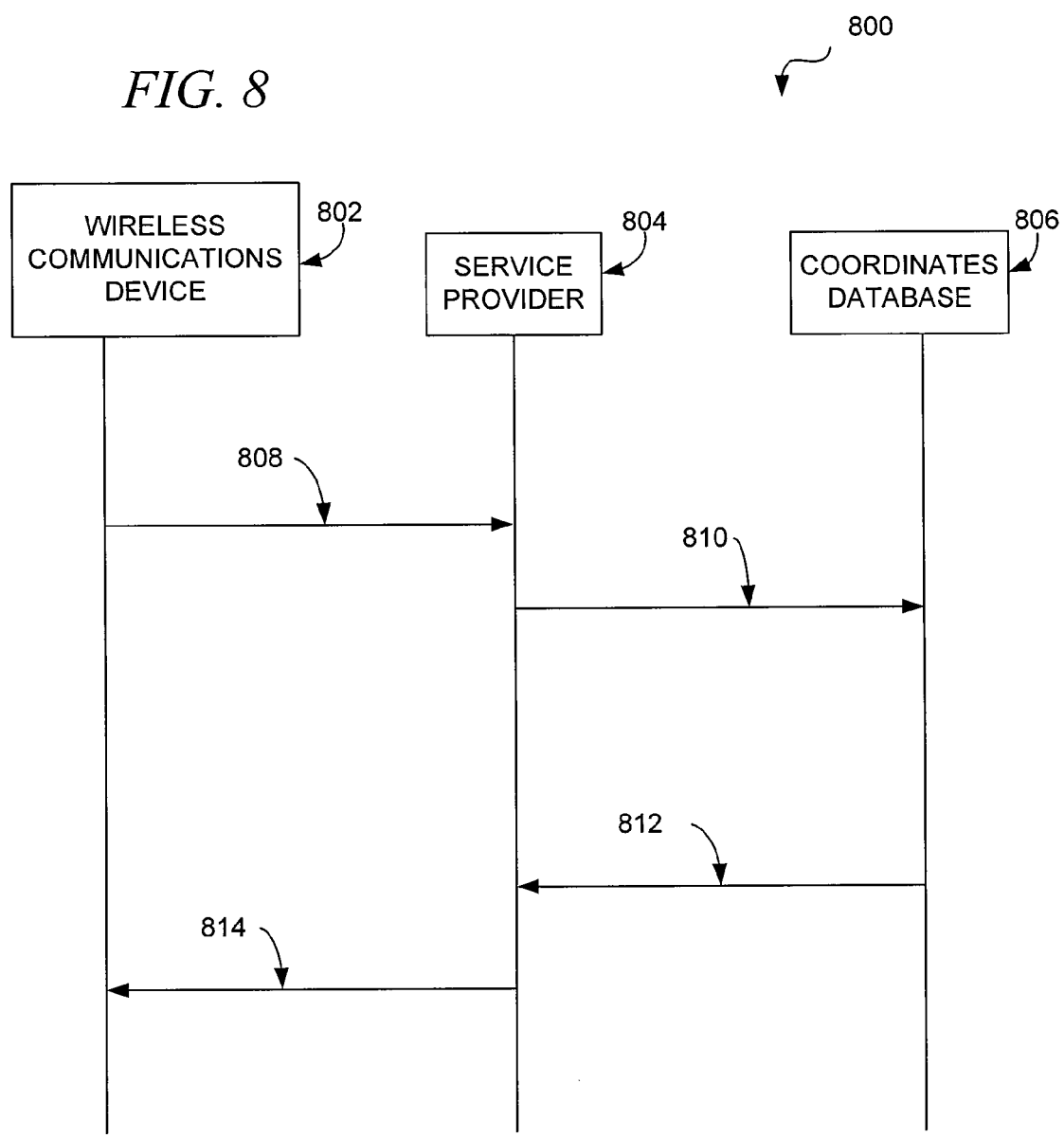
FIG. 8 is one embodiment of a timing diagram for validating communications permissions, on an ongoing basis, over a communications network.

FIG. 8 is one embodiment of a timing diagram 800 for validating communications permissions, on an ongoing basis, over a communications network. In one embodiment, it may be desired to continually update permissions for an in-progress communication, such as a telephone call. If a user of the wireless communications device 802 is moving, permissions that were in place when a call was initiated may no longer be in effect, therefore a continual check allows for restrictions to be updated.

In one embodiment, a wireless communications device 802, such as a cellular phone, PDA, or a similar device may be in communication with a service provider 804. The service provider 804 may be a cellular provider or similar service provider providing wireless communications over the communications network. The service provider 804 may further be in communication with a coordinates database 806, similar to the one or more databases located within a DBMS, as described previously.

In step 808, the wireless communications device 802 may send a query message including its current GPS coordinates, at a predetermined interval of time, to the service provider 804. The predetermined interval of time may be any period of time that is reasonable to use, such as every second, and may be determined by whether or not the wireless communications device 802 detects movement. In other words, if no movement is detected the predetermined period of time may be very large. In an alternative embodiment, a query message including the wireless communications device's current GPS coordinates are only sent when movement is detected by the wireless communications device.

In step 810, the service provider may send a query message, including the current GPS coordinates of the wireless communications device, to the coordinates database 806 to determine permissible communications status for a present location of the wireless communications device. The coordinates database 806 may then use the current GPS coordinates of the wireless communications device 802 and determine the permissible communication status based on the current GPS coordinates, time, day, and any other information provided to, or stored within the coordinates database. In an alternative embodiment, a determination may also be made as to whether the wireless communications device, continuing on the same trajectory, is anticipated to enter a location where a restriction upon communication permissions will be in place. By determining a potential future restriction, a notification may be sent to a user of the wireless communications device 802 notifying that continued movement in the current trajectory will result in restrictions, allowing the user to chose to stop moving, and maintain the communication.

In step 812, the coordinates database 806 may send a permissible communication status back to service provider 804. The service provider 804 may receive the permissible communication status for the wireless communications device 802 and process the communication status. In step 814, if the communication status now indicates that communication is not permissible, communication may be terminated to the wireless communications device 802. In one embodiment, a message or other notification may be sent to a calling party and/or the called party indicating why the communication was terminated. If the communication status still indicates that communication is permissible, then no impact to the communication takes place.

In another embodiment, time insensitive information, such as text messages, that are composed or received during a restriction upon communications may be queued and delivered upon the cessation of the restriction. By allowing time insensitive information to be queued, the possible loss of information may be reduced. Alternatively, if communication is restricted, for example, to not allow text messaging, an application providing for text messaging to be entered or received on the wireless communications device may be disabled. Whether messages composed during a restriction on text messaging would queue or not would be irrelevant, because the application would not be allowed to launch. Other applications, such as applications that control the ability to dial a number, talk without the use of a hands-free device, or other similar applications corresponding to restriction types may also be restricted, as anticipated by this embodiment.

Figure 9:
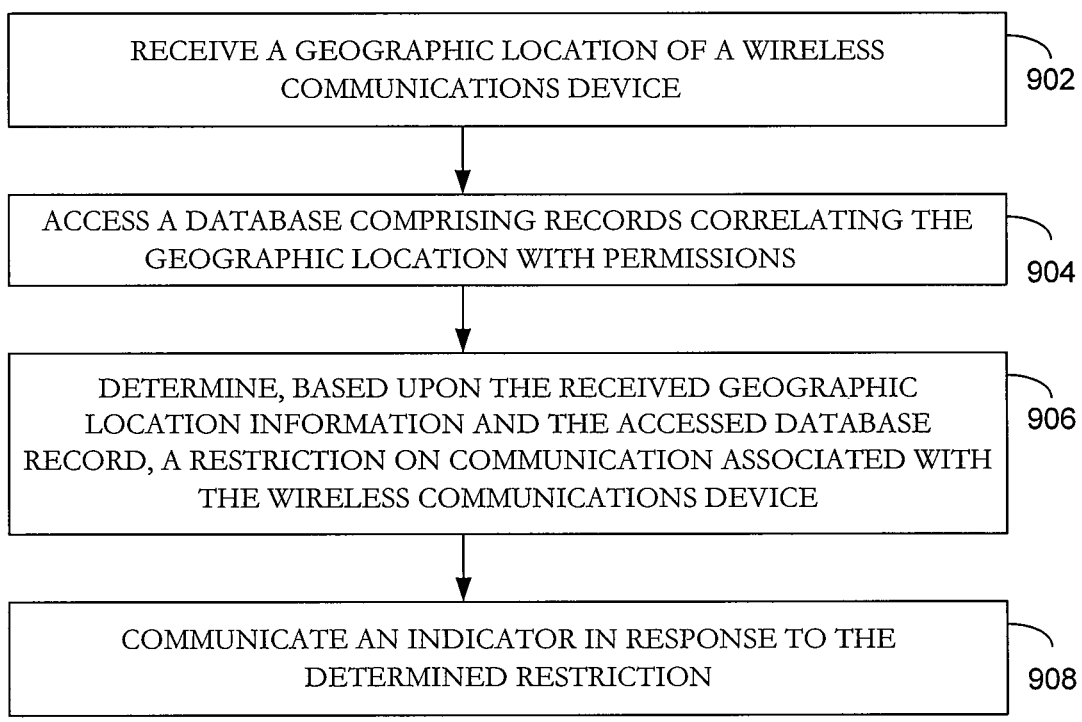
FIG. 9 is a flowchart of one embodiment of a method for validating communication for a wireless communications device.

FIG. 9 is a flowchart of one embodiment of a method 900 for validating communication for a wireless communications device. When a call or other communication is communicated from a calling party to a called party, any restrictions on the communications may be determined at the time of the call, based on the location of either the calling or called party and the particular time and day in which communication is attempted. In one embodiment, in step 902, a geographic location of a wireless communications device may be received. The geographic location may be received from GPS functionality contained within the wireless communications device, or if the wireless communications device does not have GPS functionality, triangulation, or other known methods for identifying the location of the wireless communications device may be used. In step 904, a database may be accessed comprising records correlating the geographic location with permissions. The database may be located at a service provider location, or anywhere within the communications network. By including a database outside of the control of any one service provider, all service providers may access the database to determine restrictions. As described previously, the database may contain locations, such as streets and school zones that may have restrictions in placed because of laws or other ordinances, as well as opt-in locations such as business and organizations that choose to restrict particular types of communications at their location.

Based upon the received geographic location information and the accessed database record, in step 906, a restriction on communication associated with the wireless communications device may be determined. Additionally, the database record may include information regarding specific days of the week or times of the day in which restrictions should apply. If the geographic location is associated with restrictions within the database, such as "no text messaging allowed" or "hands-free only," as well as a day of the week, or any other available information, a determination may be made as to what restrictions apply at the current location. In step 908 an indicator may be communicated in response to the determined restriction. In one embodiment, the indicator may be a command to the wireless communications device that disables an audible ring, in the event the restriction is silent mode only. In another embodiment, the indicator may be a command that inhibits any communications from occurring in the event that the restriction is on all wireless communication. Any number of actions may be associated with an indicator that places a restriction on the wireless communications device. Alternatively, if there are no restrictions located in the database for the current location, the communication is allowed to proceed as it normally would.

Figure 10:
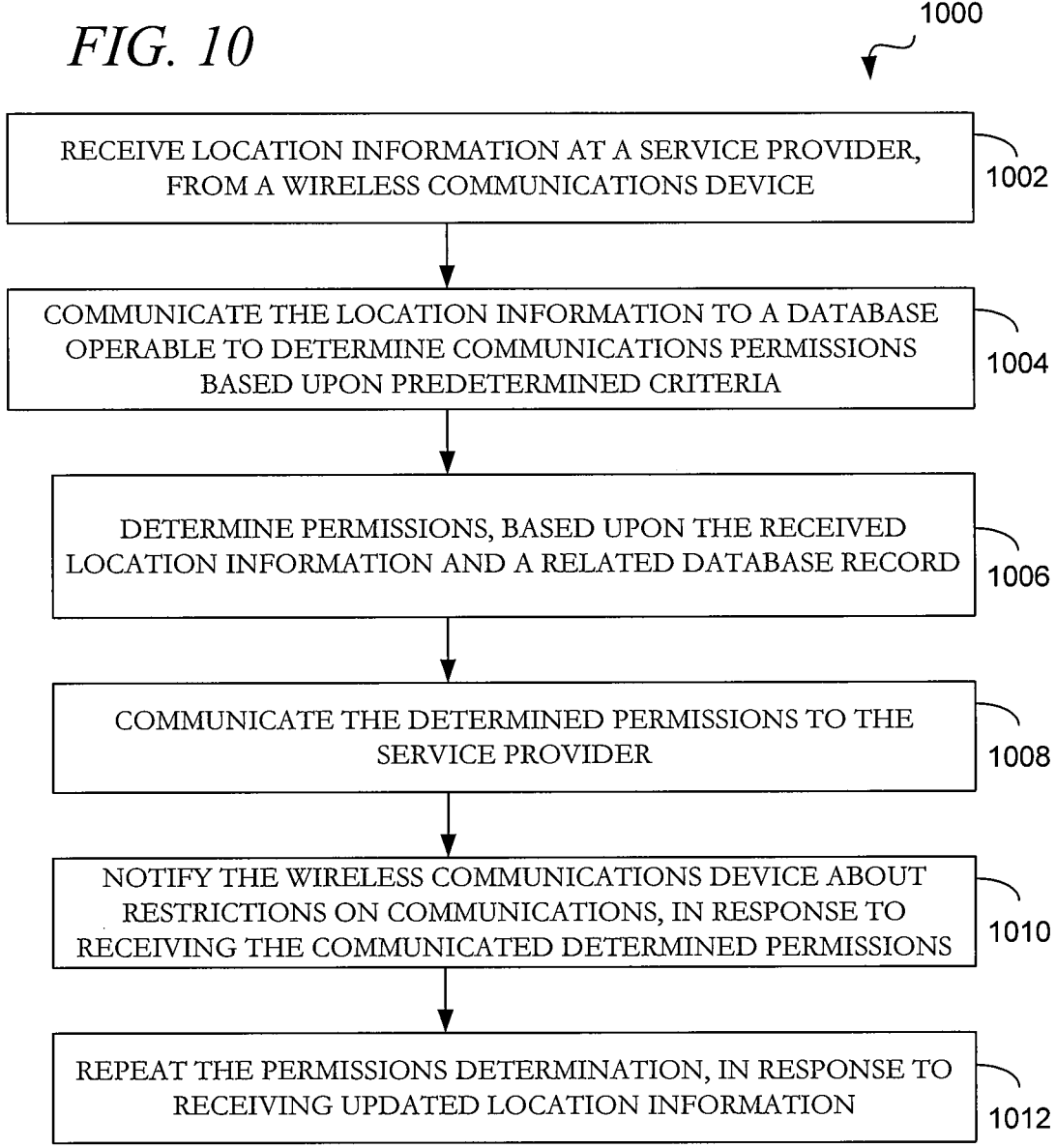
FIG. 10 is a flowchart of one embodiment of a method for continuously validating communication permissions for a wireless communications device.

FIG. 10 is a flowchart of one embodiment of a method 1000 for continuously validating communication permissions for a wireless communications device. In addition to a check for restrictions upon initiating a communication, by continuously checking for restrictions, any change in restrictions because of movement, time, or other factors, may be detected and acted upon. In one embodiment, at step 1002, location information may be received at a service provider, from a wireless communications device. Location information may be GPS coordinates, but in other embodiments, may be data based on triangulation or any other similar way of providing location information.

In step 1004, the location information may be communicated to a database operable to determine communications permissions based upon predetermined criteria. The database may be located at a switch for a service provider, or may be centrally located, in communication with many service providers. A centrally located database may allow for any service provider to access location and restriction information from a common source. Some examples of the predetermined criteria in which permissions may be based, in addition to the location information, include the time of the day, day of the week, various laws and ordinances, among other factors. For large areas in which restrictions are to be placed, a centralized coordinate with a radius, or a GPS footprint including a series of coordinates which bound an area in which restrictions are to apply, as described in FIGS. 4A and 4B, may also be included within the database.

Permissions may be determined based upon the received location information and a related database record in step 1006. In one embodiment, a related database record is a database record that includes restrictions for the particular location. Additionally, only if one or more restrictions are in place for a particular location will there be a database record for the location. In other words, if there is no database record for the location, or calculations do not place the location within a bounded area that includes restrictions, then no restrictions will be indicated by the permissions that are returned.

In step 1008, the determined permissions may be communicated to the service provider. In one embodiment, the determined permissions will indicate to the service provider whether any restrictions should be placed on communications, and if so, what type of restrictions. In response to receiving the communicated determined permissions, the wireless communications device may be notified about restrictions on communications in step 1010. For example, if a call is being placed to a user or the user is attempting to make a phone call and the determination is made that calls are not allowed to be communicated at the particular location and time, the wireless communications device may be notified in the form of a message indicating the restriction. In other embodiments, applications on the wireless communications device that enable certain types of communications (i.e., text messaging or voice calls) may simply be disabled by the restriction notification, as previously described.

In response to receiving updated location information, in step 1012, a permission determination may be repeated. In one embodiment, updated location information may be sent by a wireless communications device at a predetermined interval, upon the determination that the wireless communications device is in motion, or other similar criteria. By repeating the permissions determination process, any change in permissions based upon location or time, may be able to be detected and the permissions enforced.

Figure 11:
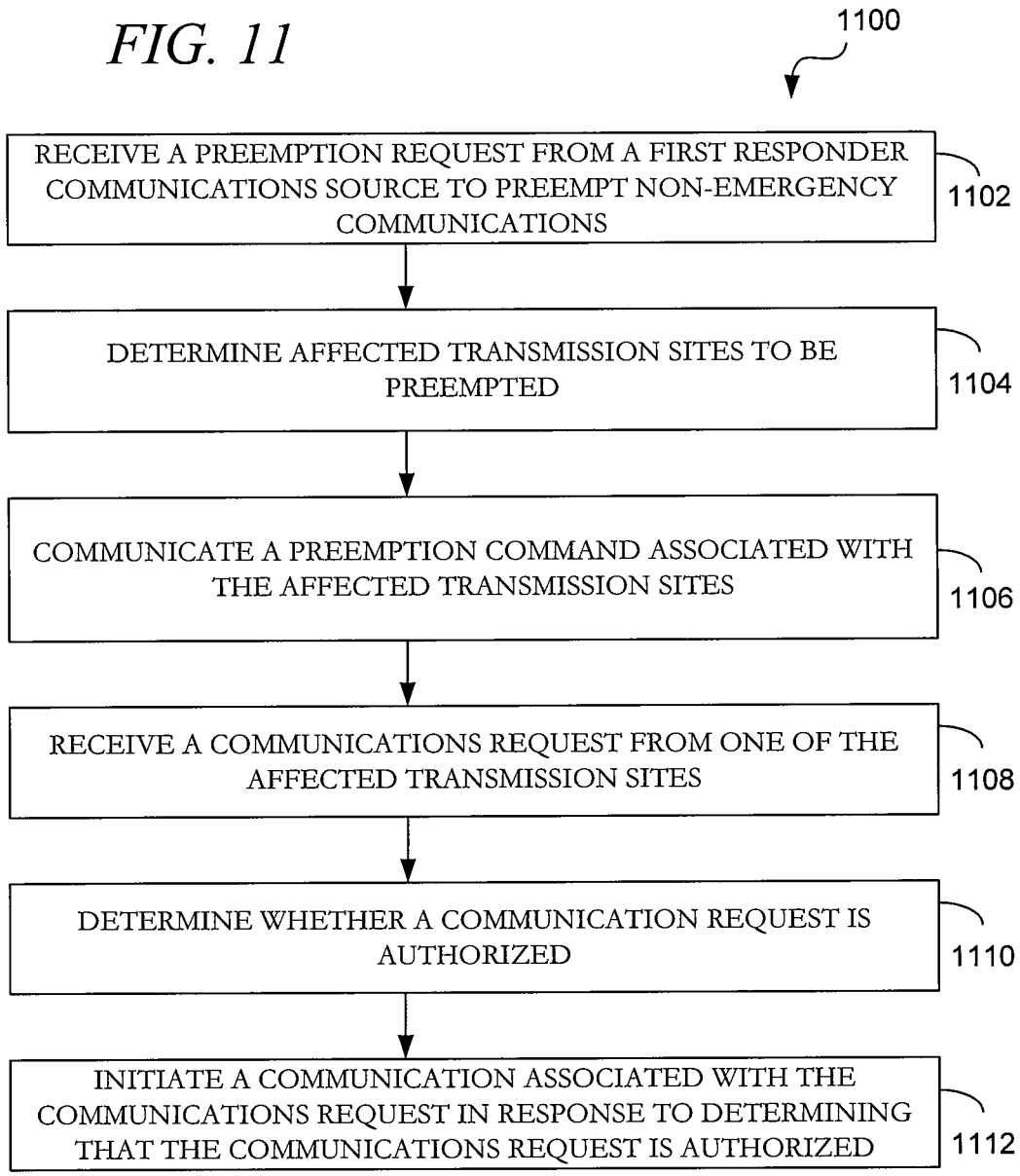
FIG. 11 is a flowchart of one embodiment for authoritative validation of mobile service permissions.

FIG. 11 is a flowchart of one embodiment 1100 for authoritative validation of mobile service permissions. In this embodiment, based upon a location of a preemption area as well as a registry of first responders, a determination may be made as to whether non-emergency calls may be preempted. In step 1102, a preemption request may be received from a first responder communications source to preempt non-emergency communications. A first responder may be law enforcement, skilled support personnel, or any other necessary personnel, which, in the event of an emergency may need access to communications networks. Alternatively, rather than preempting non-emergency calls from occurring, in one embodiment, non-emergency calls may be given a lower priority, where emergency communications are allowed to go through, but non-emergency communications may also be communicated, in the situation where there is room for non-emergency and emergency communications to both occur. Non-emergency communications may be any communications over a communications network that is not needed to support an emergency or disaster. In one embodiment, if a caller or sender of a text message is not listed within a first responder registry or another database of a selected subset of emergency personnel (like a fire chief, police lieutenant, or Mayor's office), as described previously, their communications may be considered non-emergency and may be preempted or given a lower priority.

Affected transmission sites to be preempted may be determined in step 1104. In one embodiment, transmission sites are cell towers, which are operable to communicate wireless communications over a cellular network. Whether a transmission site is one that should be preempted may depend upon such factors as proximity to a disaster or emergency site, whether the site is able to carry sufficient communications traffic, including emergency communications, as well as other factors that may support preempting the transmission site.

A preemption command associated with the affected transmission sites may be communicated in step 1106. A preemption command may be any command that is capable of being communicated over a communications network that allows a transmission site to be placed in a preempted mode. If a communication comes in to a transmission site that has been placed in a preempted mode, in one embodiment, a check may be made to determine whether the communication is considered related to an emergency or a non-emergency.

In step 1108, a communications request may be received from one of the affected transmission sites. When the communications request is received a determination may be made, in step 1110 as to whether the communications request is authorized. The determination may be made by accessing a registry or list of responders in which emergency communications are allowed, even when the transmission site is in a preempted mode. In step 1112, a communication associated with the communications request may be initiated in response to determining that the communications request is authorized. In other words, if the communications request is authorized, then the communication is allowed to proceed. However, if the communications request is not authorized, the request may either be preempted by authorized emergency communications or prioritized lower than authorized emergency communications. In the event the communications request is authorized lower than emergency communications, the communications request may still proceed, but only on a space available basis.

Figure 12:
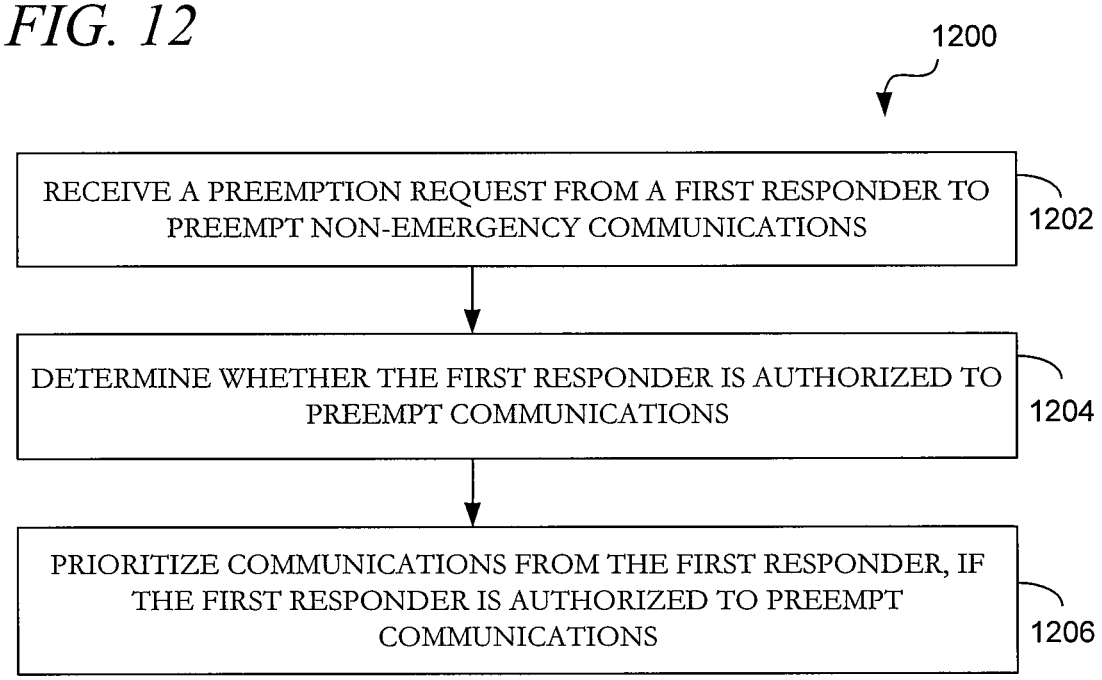
FIG. 12 is a flowchart of an additional embodiment for authoritative validation of mobile service permissions.

FIG. 12 is a flowchart of an additional embodiment 1200 for authoritative validation of mobile service permissions. In step 1202, a preemption request may be received from a first responder to preempt non-emergency communications. In this embodiment, a preemption request may be a code entered prior to a number or a particular word or sequence of digits attached to a text message, for example. In an alternative embodiment a preemption request may be a communications request sent during an emergency, when normal or non-emergency communications may be disabled or limited.

In step 1204, a determination may be made as to whether the first responder is authorized to preempt communications. In one embodiment, a first responder registry may be queried to determine if the first responder attempting the preemption request is located within the first responder registry. If the first responder is determined to be authorized to preempt communications, communications from the first responder may be prioritized in step 1206. Prioritizing, in this embodiment, may totally preclude other non-emergency communication, or may set the emergency communications to a higher priority, ensuring the communications are able to be completed. However, if the first responder is determined to not be authorized to preempt communications, the first responder may receive a notification that preemption is unavailable.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A database management system, comprising:
   a processor;
   a memory;
   data, the data being stored by the memory and accessible by the processor;
   the processor being configured to execute the data to:
      receive a geographic location of a wireless communications device;
      determining a trajectory of the wireless communication device and whether the wireless communication device is projected to enter an area associated with restrictions on communication;
      access a database comprising records correlating the geographic location with permissions;
      sending a notification to the wireless communications device indicating that the restrictions associated with the area will be placed on the wireless device if the wireless communications device enters the area in response to the wireless device approaching the area in the trajectory;
      determine, based upon the received geographic location and the permissions stored in the accessed database, the restrictions on communication associated with the wireless communications device;
      communicate an indicator configuring the wireless communications device in response to the restrictions being implemented; and
      allow emergency communications from the wireless communications device despite the restrictions.

2. The database management system according to claim 1, wherein, in receiving the geographic location of the wireless communications device, the processor is further configured to receive geographic coordinates.

3. The database management system according to claim 1, wherein communicating the indicator, further includes communicating a deny flag.

4. The database management system according to claim 1, wherein the processor is further configured to communicate a notification to a user of the wireless communications device indicative of the restrictions being placed on the wireless device.

5. The database management system according to claim 4, wherein the notification is a text message, and wherein the notification includes the permissions.

6. The database management system according to claim 1, wherein, the indicator is further operable to configure at least a switch of a network, to restrict communication by the wireless communications device over the network.

7. The database management system according to claim 1, wherein the processor is further configured to determine whether the received location information is feasible based on tower location information.

8. The database management system according to claim 1, wherein, in accessing the database, the processor is further configured to access data containing a radius around the geographic location, and wherein the database is centralized for access by a plurality of communications service providers.

9. The database management system according to claim 1, wherein a notification is sent to a communicating party communicating with the wireless communications device indicating the restrictions imposed on the wireless communications device in response to receiving a communication from the communicating party.

10. The database management system according to claim 1, wherein the processor is further configured to associate the geographic location with a business location, and wherein, in associating the geographic location with a business location, the processor is further configured to allow businesses to impose restrictions for wireless communications within a facility of the business.

11. A method for validating communication for a wireless communications device, the method comprising:
    receiving a geographic location of a wireless communications device;
    determining a projected movement of the wireless communication device and whether the wireless communication device is projected to enter an area associated with restrictions on communication;
    accessing a database comprising records correlating the geographic location with permissions;
    sending a notification to the wireless communications device indicating that the restrictions associated with the area will be placed on the wireless device if the wireless communications device enters the area in response to the wireless device approaching the area;
    determining, based upon the received geographic location information and the accessed database, the restrictions on communication associated with the wireless communications device;
    communicating an indicator configuring the wireless communications device in response to the restrictions being implemented; and
    allowing emergency communications from the wireless communications device.

12. The method according to claim 11, wherein receiving the geographic location of the wireless communications device, includes receiving geographic coordinates.

13. The method according to claim 11, wherein communicating the indicator, includes communicating a deny flag.

14. The method according to claim 11, further comprising communicating a notification to a user of the wireless communications device indicative of the restrictions being implemented.

15. The method according to claim 14, wherein the notification is text message, and wherein the notification includes the permissions.

16. The method according to claim 11, wherein the indicator is further operable to configure at least a switch of a network to restrict communication by the wireless communications device over the network.

17. The method according to claim 11, further comprising determining whether the received location information is feasible based on tower location information.

18. The method according to claim 11, wherein accessing a database includes accessing data containing a radius around the geographic location, and wherein the database is centralized for access by a plurality of communications service providers.

19. The method according to claim 11, further comprising:
sending a notification to a communicating party communicating with the wireless communications device indicating the restrictions imposed on the wireless communications device in response to receiving a communication from the communicating party.

20. The method according to claim 11, further including associating the geographic location with a business location, wherein associating the geographic location with a business location includes allow businesses to impose restrictions for wireless communications within a facility of the business.

* * * * *